(12) United States Patent
Lin et al.

(10) Patent No.: US 10,344,814 B2
(45) Date of Patent: Jul. 9, 2019

(54) BRAKE

(71) Applicant: Yong Lin, Chengdu (CN)

(72) Inventors: Yong Lin, Chengdu (CN); Jianping Xie, Chengdu (CN)

(73) Assignee: Yong Lin, Chengdu (CN)

(*) Notice: Subject to any disclaimer, the term of this patent is extended or adjusted under 35 U.S.C. 154(b) by 75 days.

(21) Appl. No.: 15/698,668

(22) Filed: Sep. 8, 2017

(65) Prior Publication Data
US 2018/0080516 A1   Mar. 22, 2018

(30) Foreign Application Priority Data

Sep. 22, 2016  (CN) .......................... 2016 1 0859165

(51) Int. Cl.
| F16D 65/22 | (2006.01) |
| F16D 65/18 | (2006.01) |
| F16D 59/02 | (2006.01) |
| B60T 13/22 | (2006.01) |
| B60T 13/58 | (2006.01) |
| F16D 55/2265 | (2006.01) |
| F16D 121/04 | (2012.01) |
| F16D 125/02 | (2012.01) |
| F16D 125/04 | (2012.01) |
| F16D 125/08 | (2012.01) |
| F16D 127/02 | (2012.01) |
| F16D 129/02 | (2012.01) |
| F16D 121/06 | (2012.01) |

(52) U.S. Cl.
CPC .............. *F16D 65/18* (2013.01); *B60T 13/22* (2013.01); *B60T 13/581* (2013.01); *F16D 55/2265* (2013.01); *F16D 59/02* (2013.01); *F16D 2121/04* (2013.01); *F16D 2121/06* (2013.01); *F16D 2125/023* (2013.01); *F16D 2125/026* (2013.01); *F16D 2125/04* (2013.01); *F16D 2125/08* (2013.01); *F16D 2127/02* (2013.01); *F16D 2129/02* (2013.01)

(58) Field of Classification Search
CPC ........ F16D 59/02; B60T 13/22; B60T 13/581; B60T 13/58
USPC ................................................. 188/165, 170
See application file for complete search history.

(56) References Cited

U.S. PATENT DOCUMENTS

| 3,677,607 A | * | 7/1972 | Schultz ................. B60T 13/141 188/106 P |
| 3,768,608 A | * | 10/1973 | Fulmer ................. B60T 13/146 188/106 P |
| 3,791,492 A | * | 2/1974 | Neilsen ................... F16D 59/02 188/106 P |

(Continued)

*Primary Examiner* — Nicholas J Lane
(74) *Attorney, Agent, or Firm* — Gokalp Bayramoglu

(57) ABSTRACT

A brake used by a mine hoist, a car, a high-speed train, etc. Gas springs are used to replace belleville springs, and a positive pressure is also always applied to brake pads to both ensure and increase the brake reliability and a positive pressure per unit area. The brake resolves problems such as deformation of the belleville springs, a serious change in an elastic force, sudden cracking and decompression, inconvenient monitoring, and a manufacturing difficulty. A brake head floating structure is used to reduce a requirement on end face runout of a brake disc. An oil-gas linkage plunger pump is used to replace a hydraulic station, which greatly reduces manufacturing costs, and reduces energy consumption.

12 Claims, 15 Drawing Sheets

(56) References Cited

U.S. PATENT DOCUMENTS

| | | | | |
|---|---|---|---|---|
| 3,893,549 A * | 7/1975 | Bennett | ............... | B60T 17/22 |
| | | | | 188/170 |
| 3,999,634 A * | 12/1976 | Howell | ............... | F16D 55/40 |
| | | | | 188/71.6 |
| 6,386,339 B1 * | 5/2002 | Woollams | ............ | F16D 59/02 |
| | | | | 188/170 |
| 2011/0278914 A1 * | 11/2011 | Kobelt | ............. | B60T 17/081 |
| | | | | 303/13 |

* cited by examiner

BRAKE

CROSS REFERENCE TO RELATED APPLICATIONS

This application claims priority to Chinese Patent Application No. CN 2016108591653, filed on Sep. 22, 2016, the entire contents of which are incorporated herein by reference.

TECHNICAL FIELD

The present invention relates to a large or medium-sized Lin-Xie (surnames of the inventors) brake used by a mine hoist, a car, a high-speed train, or the like.

BACKGROUND OF THE INVENTION

Currently, disc brakes used by mine hoists, cars, high-speed trains, and the like each include three systems of a brake, a hydraulic and pneumatic station, and an electric control system. A belleville spring provides a positive pressure to brake pads, and the brake pads and a brake disc generate friction to implement brake. The operating principle is that the hydraulic and pneumatic station performs pressure relief for brake and pressurization for brake release. The system has the following problems. Deformation of the belleville spring (refer to FIG. 15 in the specification) causes a great change in an elastic force, the belleville spring has high requirements for the material, machining, and a heat treatment process, and it is inconvenient to monitor cracking of the belleville spring during operation. Because of the structure feature, a maximum positive pressure of a disc brake that has a belleville spring in a mine hoist and that is currently manufactured is 100000 N. The disc brake is manufactured by CITIC A hydraulic station system is complex, and the manufacturing costs are high. In addition, the hydraulic station cannot stop when a hoist or a high-speed train runs, a hydraulic pump cannot stop, and a motor performs useless work in most of the time. A drum hoist with a 5-m diameter manufactured by CITIC HIC is used as an example, there are 20 (10 pairs of) brake heads, and the manufacturing costs are greater than RMB 600000. The manufacturing costs of a hydraulic station are greater than RMB 600000, and energy consumed by a hydraulic pump motor is 4 kWh. The motor runs at day and night, increasing a load on a user, and wasting resources. For a disc brake used for a heavy duty truck, a maximum brake torque is no greater than 10000 N*m, but the maximum brake torque of a Lin-Xie brake in a same size may be 30000 N*m.

In the Lin-Xie brake of the present invention, a high-pressure nitrogen cylinder provides a positive pressure to brake pads. The high-pressure nitrogen cylinder may be conveniently manufactured. A piston displacement of the nitrogen cylinder has a small effect on a change of an elastic force (refer to FIG. 15 in this specification). Only injection of nitrogen pressure needs to be conveniently changed, the positive pressure may be precisely provided to the brake pads. The high-pressure nitrogen cylinder is used as a gas spring, and has low requirements for the material and processing techniques. An operating pressure of an oil seal is not greater than 8 MPa. Usually, an allowable operating pressure of the oil seal is up to 38 MPa. An operating pressure of the oil seal in the Lin-Xie brake is far less than 38 MPa, and the oil seal has a short stroke and a slow speed, to ensure that the oil seal is used for a long period of time. The oil seal only needs to be replaced regularly (more than five years), and the nitrogen cylinder has only one air inlet passage and is provided with a one-way valve. Even though an air inlet pipe and associated bolts and nuts are removed, it can still be ensured that the high-pressure nitrogen in the nitrogen cylinder does not leak, and the brake pads are always provided with a preset positive pressure to implement brake at any time. Even though the high-pressure nitrogen leaks during operation, first, a nitrogen cylinder is provided to supplement nitrogen, to provide a positive pressure in a considerably long period of time except that loss of the pressure suddenly occurs because of extreme conditions such as fires and explosions (the belleville spring is also ineffective in this case). Second, an instrument is provided to facilitate monitoring, to process the nitrogen leakage in a timely manner. However, the belleville spring may suddenly crack. Therefore, when the high-pressure nitrogen cylinder is used as a gas spring, the reliability of the high-pressure nitrogen cylinder is undoubtedly greater than the reliability of the belleville spring.

In view of the features of the high-pressure nitrogen cylinder, for a mine hoist, only a Lin-Xie brake of one specification and one size needs to be manufactured to replace all belleville spring brakes. Currently, belleville spring brakes have multiple specifications, and their positive pressure is from 10000 N to 100000 N. For example, an inner diameter of a working cylinder of a Lin-Xie brake used by a hoist is 200 mm. A pressure of nitrogen stored in a nitrogen cylinder is usually 12 MPa, and an allowable pressure is from 0 MPa to 8 MPa. A positive pressure of 200*200*3.14±4*(0–8)=0–251200 N may be generated to be applied to brake pads. Only a hydraulic fluid pipe connector provided with a damper hole is not universal. In addition, pressure changes of the nitrogen cylinder can be conveniently monitored. An oil-gas linkage plunger pump is used to provide power for brake or release of the brake pads, to replace the hydraulic station. Compressed air used by the Lin-Xie brake of the present invention may be directly connected to a pipeline of an air compression station of a mine, a car, or a high-speed train. Alternatively, an air compressor may be provided. Because the air compressor is provided with an air container, a motor of the air compressor does not need to continuously run, to reduce energy consumption. Costs of the air compressor are less than one tenth of costs of the hydraulic station.

For an original hoist using belleville spring brakes, because a deformation of a belleville spring brake is low, the belleville spring brakes only can be separately fixed on a base and have no servo effect. Therefore, a requirement on end face runout of a brake disc of a hoist drum is high, and a requirement on installation of the base is also high. However, for the Lin-Xie brake of the present invention, a floating support used to support a brake head has a servo effect. Therefore, a requirement on end face runout of a brake disc is low, and a requirement on installation of a base is also low. Therefore, the Lin-Xie brake of the present invention is an ideal product to replace the original belleville spring brake.

SUMMARY OF THE INVENTION

The present invention relates to a Lin-Xie brake used by a mine hoist, a car, a high-speed train, or the like.

The Lin-Xie brake includes components such as a bolt 1, a secondary brake head 2, a plurality of brake pads 3, a support base 4, a floating support 5, a primary brake head 6, a hydraulic fluid pipeline 7, a nitrogen pipeline 8, an oil-gas linkage plunger pump 9, a nitrogen cylinder 10, a pin shaft 11, a cover 12, a first spring 13, a floating limiting oil cylinder 14, a washer 15, a first baffle plate 16, a floating limiting oil cylinder piston rod 17, a floating limiting oil cylinder cover 18, an oil seal a 19, an second oil seal 20, a one-way valve plug 21, a second spring 22, an third oil seal 23, a first external circlip 24, a hydraulic fluid 25, a floating limiting oil cylinder piston 26, a floating limiting oil cylinder tube 27, an fourth oil seal 28, a floating limiting oil cylinder rear cover 29, a first nut 30, a nitrogen cylinder piston 31, high-pressure nitrogen 32, a high-pressure nitrogen cylinder tube 33, a second nut 34, a fifth oil seal 35, a sixth oil seal 36, an seventh oil seal 37, a hydraulic fluid pipe connector 38, a spacer 39, a primary brake head shaft 40, a primary brake head piston 41, an eighth oil seal 42, a primary brake head oil cylinder tube 43, a stroke-limiting oil cylinder 44, a high-pressure nitrogen pipe connector 45, a second baffle plate 46, a third spring 47, a stroke-limiting oil cylinder shaft 48, an tenth oil seal 49, a stroke-limiting oil cylinder tube 50, a steel ball 51, a second external circlip 52, an eleventh oil seal 53, a stroke-limiting oil cylinder cover 54, a puller bolt 55, a stroke-limiting oil cylinder piston 56, a nitrogen one-way valve body 57, a thirteenth oil seal 58, a plunger oil cylinder cover 59, a plunger oil cylinder tube 60, a plunger 61, a fourteenth oil seal 62, an air cylinder cover 63, an air cylinder tube 64, a plunger tappet 65, an air cylinder piston 66, a sixteenth oil seal 67, a compressed air 68, an air cylinder tube rear cover 69, the air inlet regulator valve 70, the air outlet regulator valve 71, and a seventeenth oil seal 72.

The brake disc 73 is an inherent component of a mine hoist, a high-speed train, or the like, and is not the Lin-Xie brake of the present invention.

Currently, a belleville spring brake includes components such as a brake head 74, a belleville spring 75, a cylinder liner 76, an eighteenth oil seal 77, an oil cylinder body 78, a piston 79, a nineteenth oil seal 80, a fastened nut 81, and a nut d 82.

Features of the Lin-Xie brake of the present invention are that: the brake pads 3 always bear a positive pressure applied by the high-pressure nitrogen 32, and the brake pads 3 are braked and released by using the oil-gas linkage plunger pump 9. The floating support 5 is restricted by two pin shafts 11 and can only move left and right by a degree of freedom along an axis of the pin shafts 11. The floating support 5 moves by a half of a stroke displacement relative to the plurality of brake pads 3 on the primary brake head 6 each time when the floating support 5 is braked and released under restraint of the first spring 13 and the floating limiting oil cylinder 14, to ensure gaps between two brake pads 3 and the brake disc 73 are the same. After the two brake pads 3 are slightly abraded during each brake, the floating support 5 may move toward one side of the primary brake head 6 by a double abrasion distance, and is locked under restraint of the floating limiting oil cylinder 14. The brake pads 3 at sides of the primary brake head 6 can release only a particular stroke under restraint of the stroke-limiting oil cylinder 44. The stroke-limiting oil cylinder 44 follows the abrasion of the plurality of brake pads 3 under a combined action of the second baffle plate 46, the third spring 47, the stroke-limiting oil cylinder shaft 48, the tenth oil seal 49, the stroke-limiting oil cylinder tube 50, the steel ball 51, the second external circlip 52, the eleventh oil seal 53, the stroke-limiting oil cylinder cover 54, and the puller bolt 55, and cannot recoil. Only when the plurality of brake pads 3 are replaced with new ones, the stroke-limiting oil cylinder 44 may recoil when the puller bolt 55 is released. For the oil-gas linkage plunger pump 9, the compressed air 68 enters a set empty chamber by using the air inlet regulator valve 70 to push the air cylinder piston 66, the air cylinder piston 66 pushes the plunger tappet 65, the plunger tappet 65 pushes the plunger 61, and the plunger 61 compresses the hydraulic fluid 25 to inject the hydraulic fluid 25 into a set oil inlet chamber of the primary brake head 6, to release the plurality of brake pads 3. The oil-gas linkage plunger pump 9 discharges air by using the air outlet regulator valve 71, and the hydraulic fluid 25 flows back to the plunger oil cylinder tube 60 under an action of the high-pressure nitrogen 32, to brake the plurality of brake pads 3.

Operating Principle of the Present Invention:

An operating principle of a Lin-Xie brake of the present invention is that: when a brake disc 73 needs to stop rotating, a system instructs an air outlet regulator valve 71 of an oil-gas linkage plunger pump 9 to discharge a portion of compressed air 68, and simultaneously close an air inlet regulator valve 70, so that the plurality of brake pads 3 tightly abut against the brake disc 73 under a pressure, to generate a brake force, and the brake disc 73 is enabled to softly stop rotating; when brake is needed if an emergency occurs, the system instructs the oil-gas linkage plunger pump 9 to fully open the air outlet regulator valve 71, and simultaneously close the air inlet regulator valve 70, so that the plurality of brake pads 3 tightly abut against the brake disc 73 under a set maximum pressure, and the plurality of brake disc 73 is enabled to rapidly stop rotating; when the plurality of brake pads 3 need to be released in a brake state, the system instructs the oil-gas linkage plunger pump 9 to open the air inlet regulator valve 70, and simultaneously close the air outlet regulator valve 71, to take in some compressed air 68 as a pressure, and maintain the pressure, where the pressure taken in can release the plurality of brake pads 3.

REFERENCE SIGNS

Figure 1:
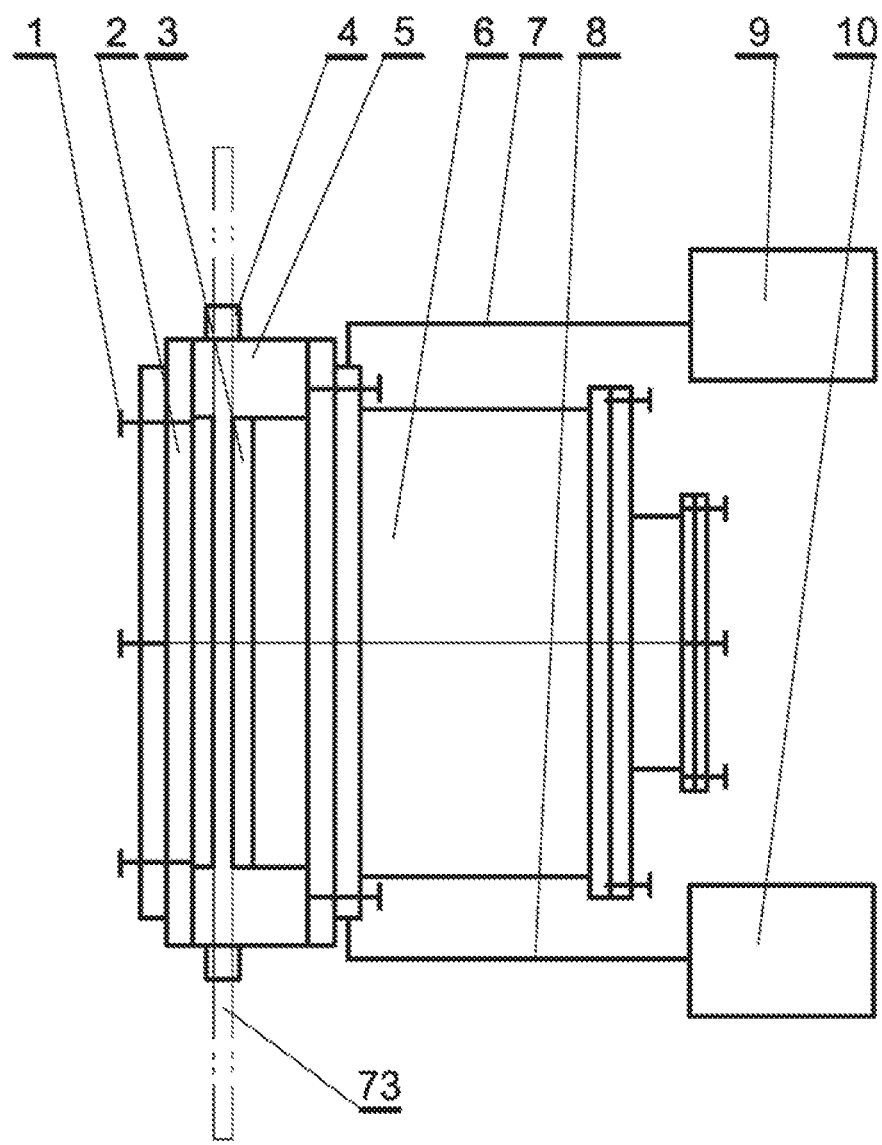
FIG. 1 is a front view of a Lin-Xie brake of the present invention.
Figure 2:
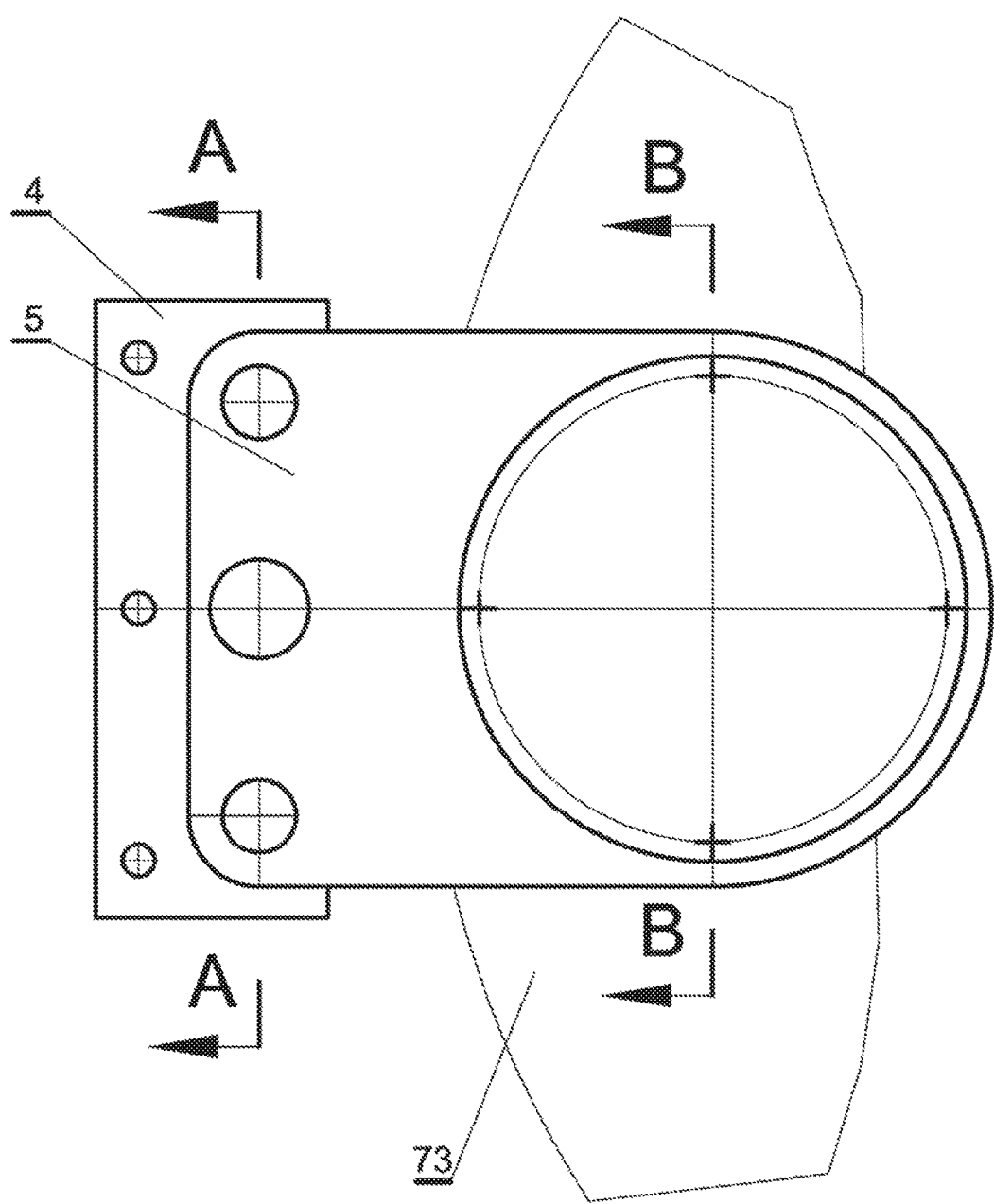
FIG. 2 is a side view of the present invention.
Figure 3:
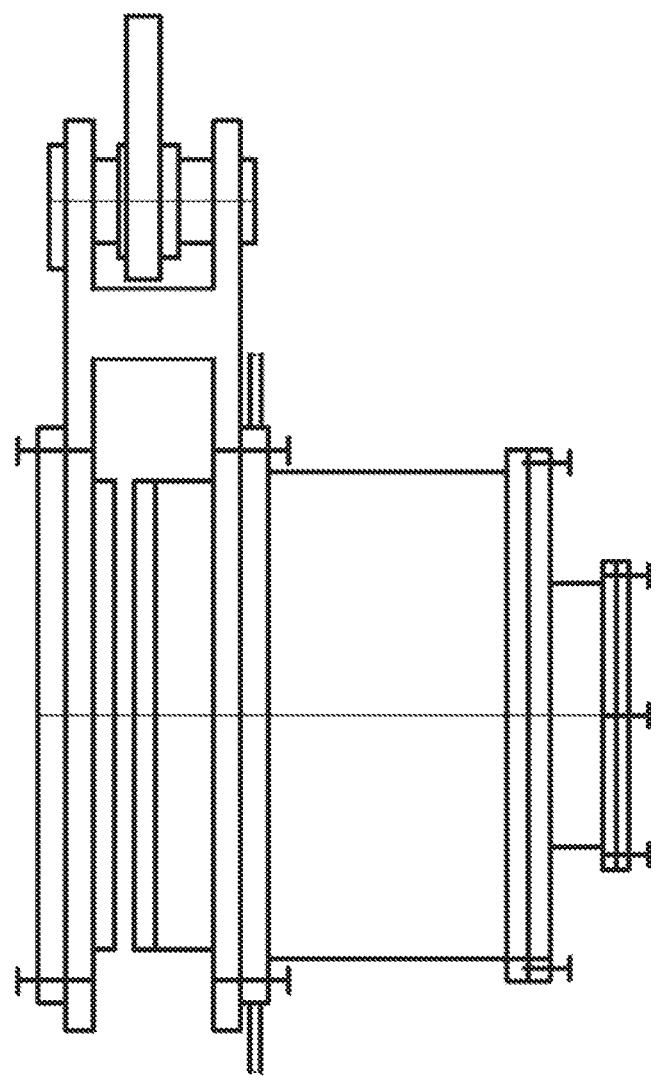
FIG. 3 is a top view of the present invention.
Figure 4:
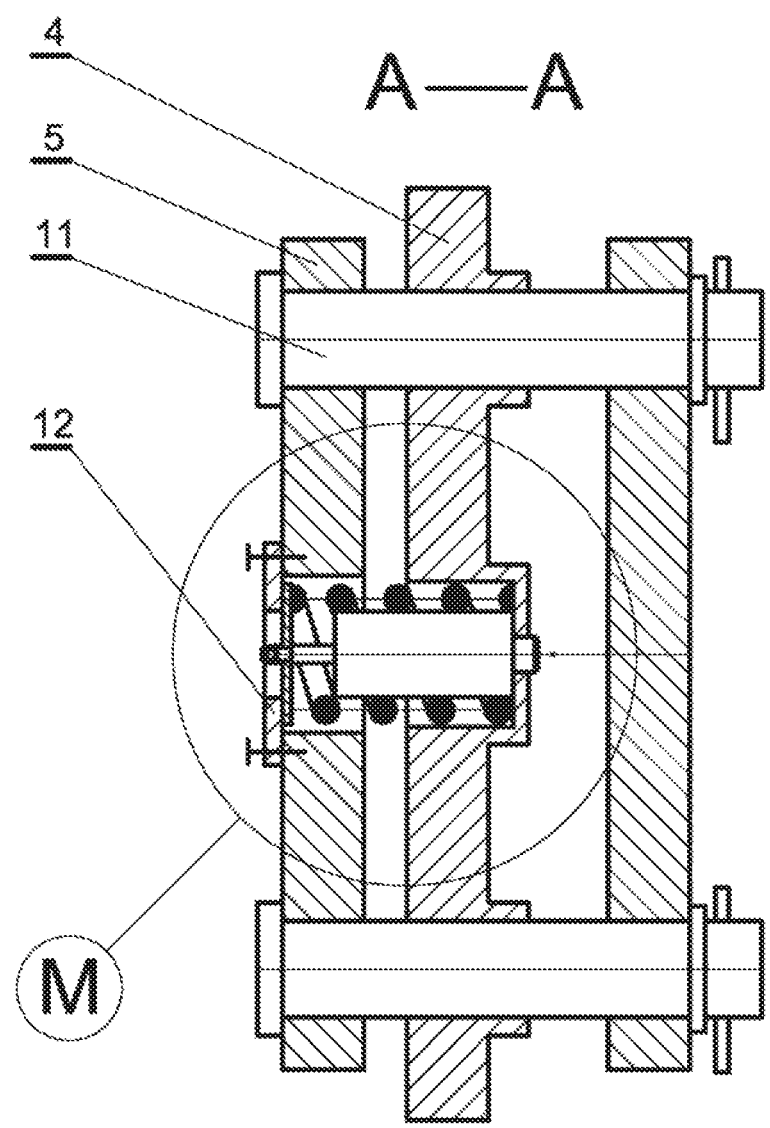
FIG. 4 is a view of a cross section A-A of the present invention.
Figure 5:
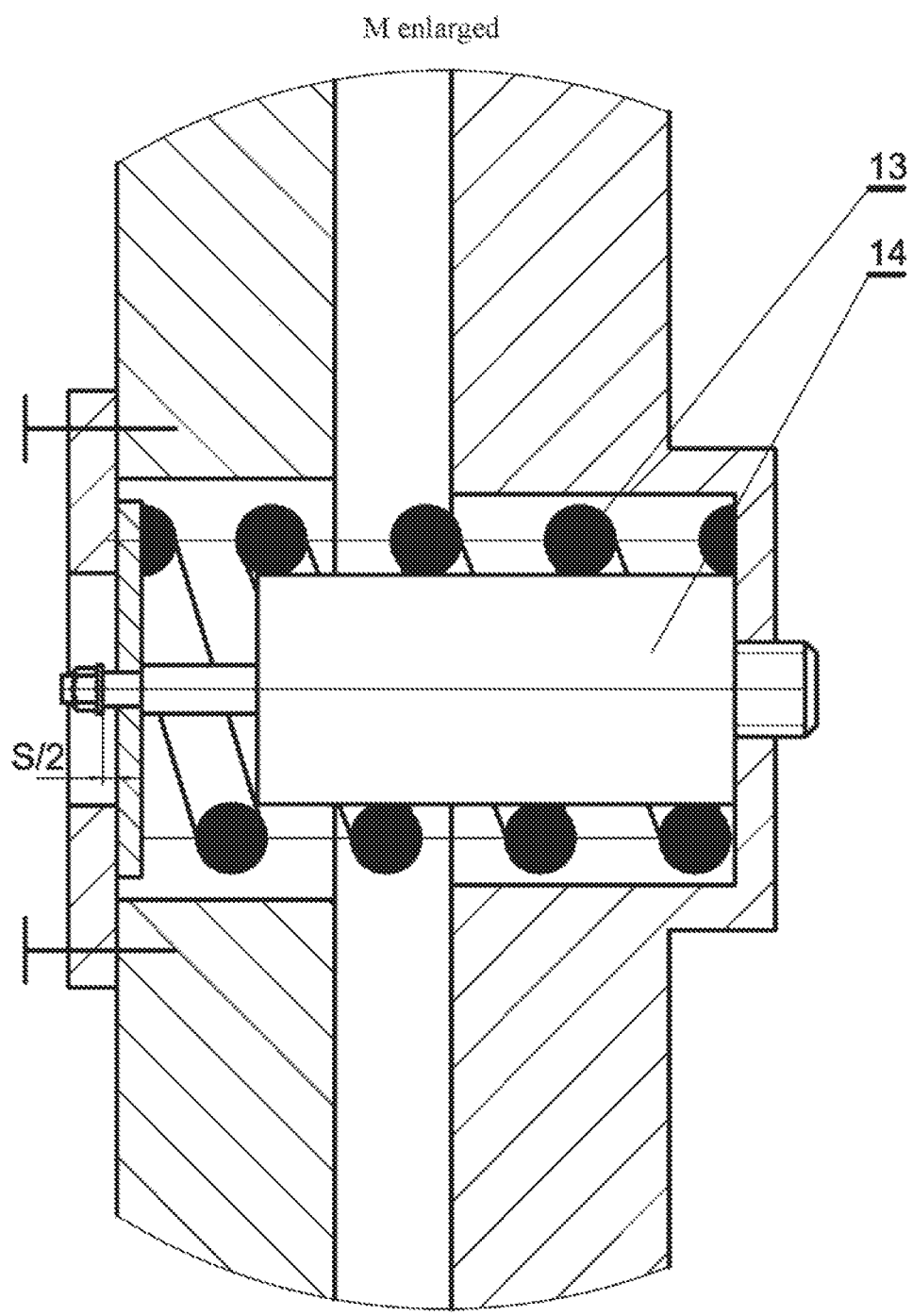
FIG. 5 is an enlarged view of a part M in a cross section A-A of the present invention, where S shown in the figure is a stroke of the plurality of brake pads 3 on a primary brake head 6.
Figure 6:
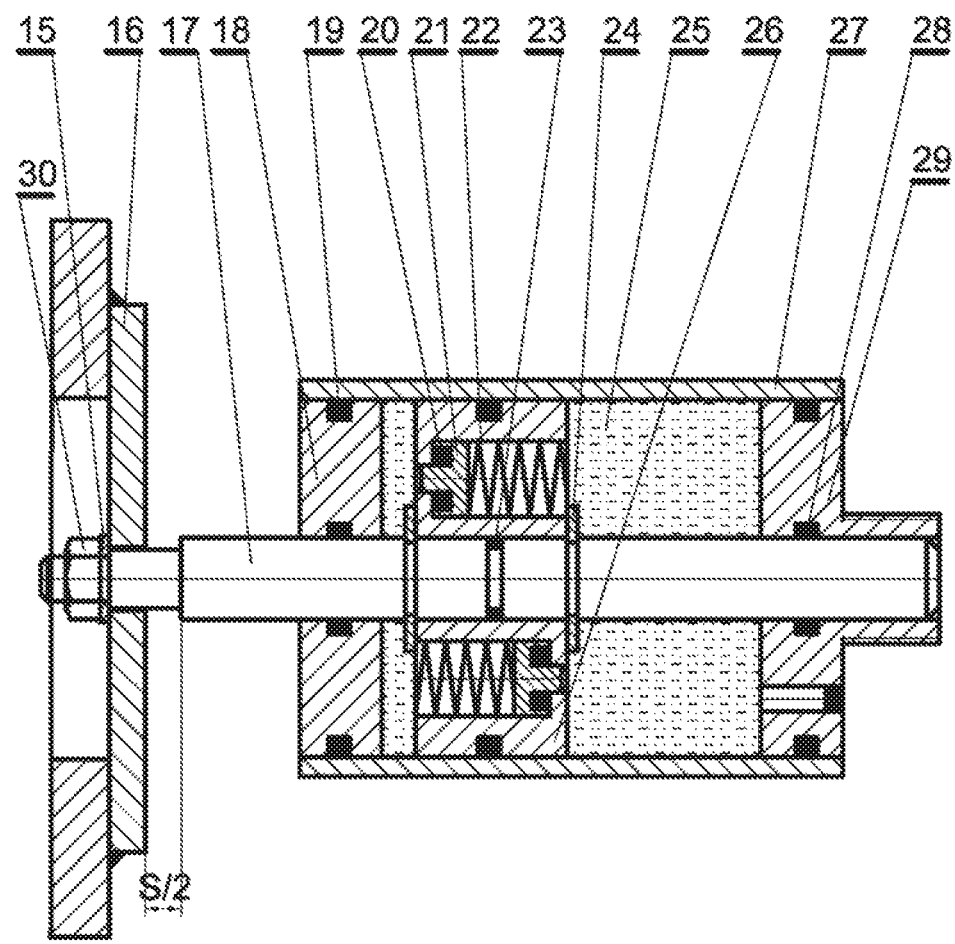
FIG. 6 is a view of a full cross section of a floating limiting oil cylinder 14 of the present invention, where S shown in the figure is a stroke of the plurality of brake pads 3 on a primary brake head 6.
Figure 7:
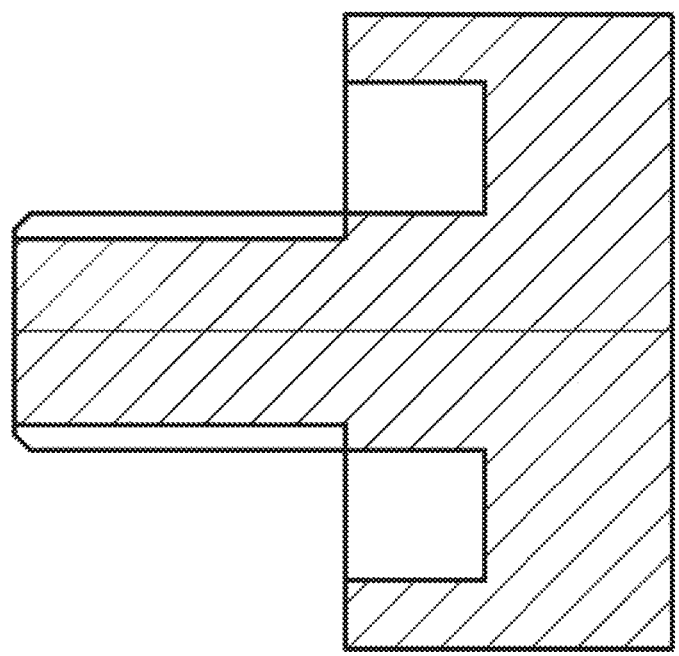
FIG. 7 is a view of a full cross section of a one-way valve plug 21 of the present invention.
Figure 8:
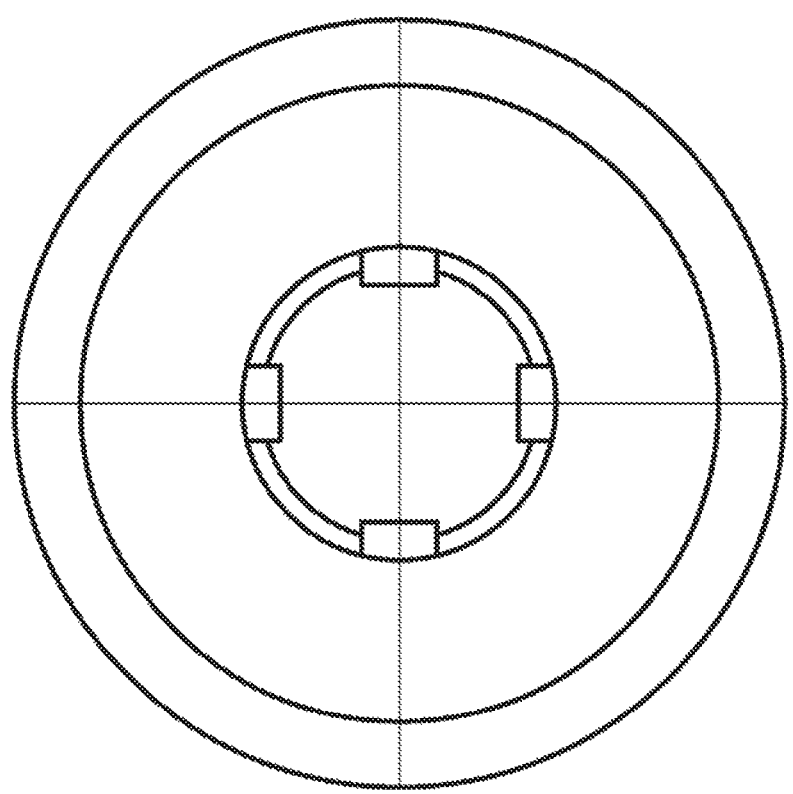
FIG. 8 is a side view of a one-way valve plug 21 of the present invention.
Figure 9:
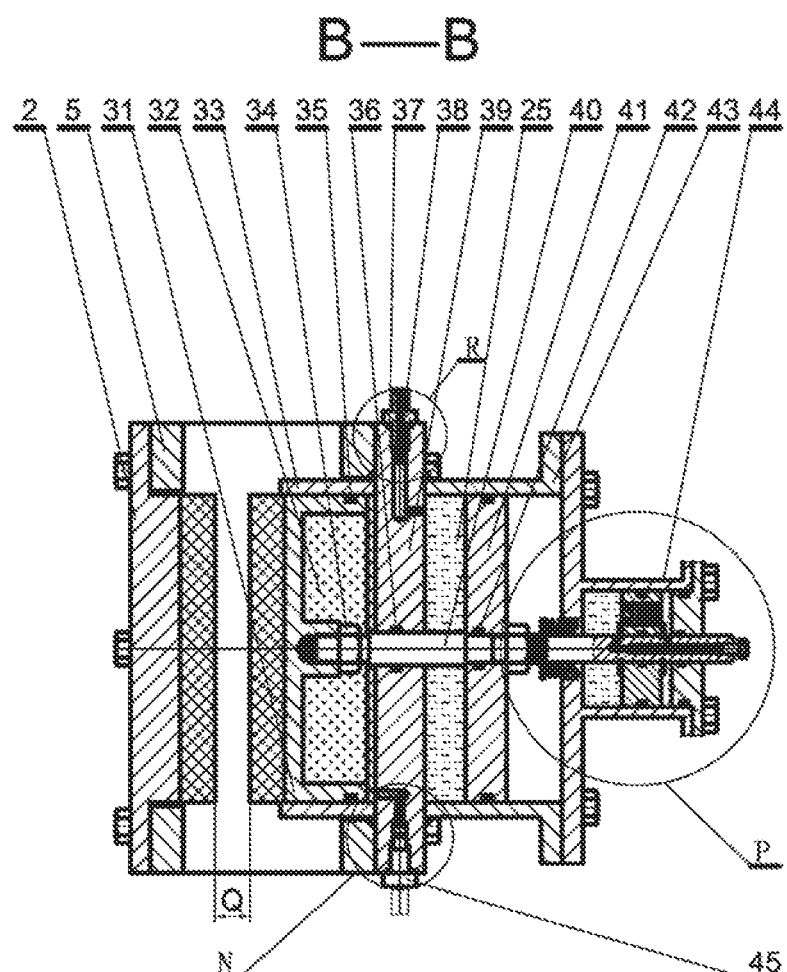
FIG. 9 is a view of a cross section B-B of the present invention, where G shown in the figure is a thickness of a brake disc 73.
Figure 10:
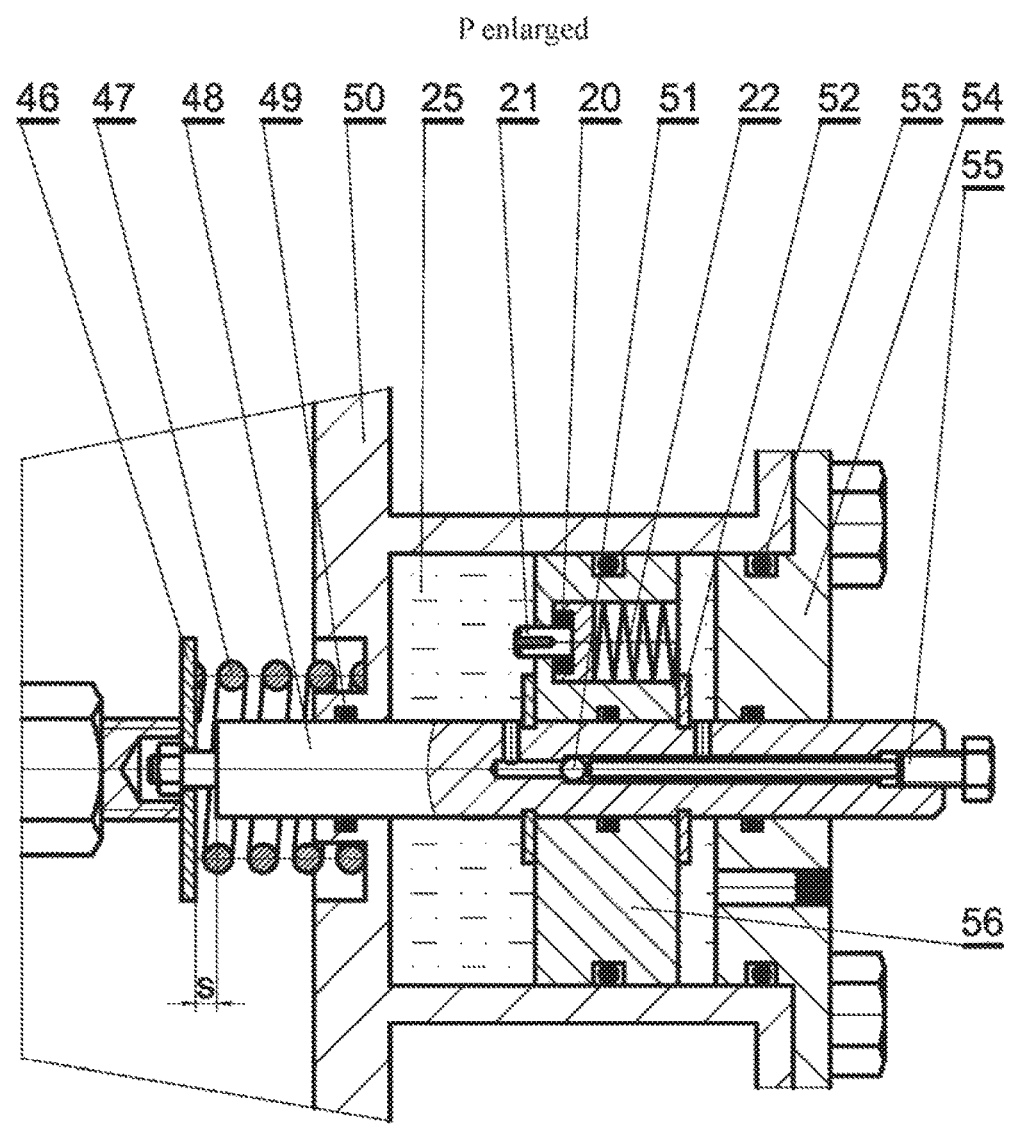
FIG. 10 is a view of a full cross section of a stroke-limiting oil cylinder 44 of the present invention, where S shown in the figure is a stroke of the plurality of brake pads 3 on a primary brake head 6.
Figure 11:
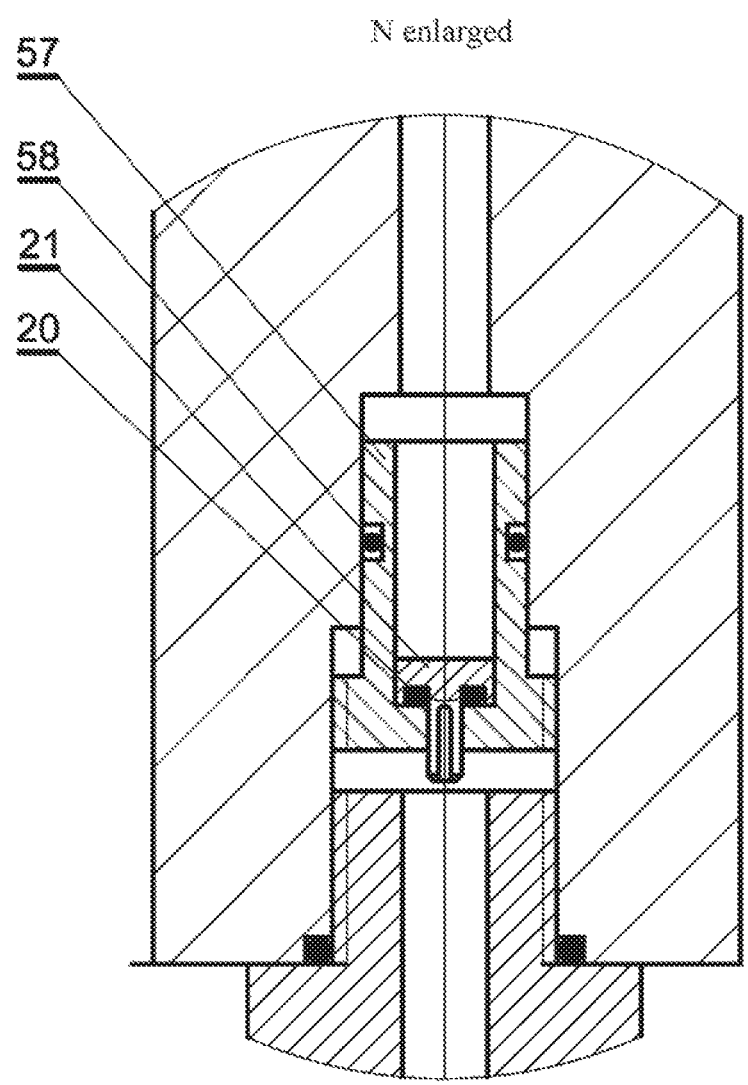
FIG. 11 is an enlarged view of a part N in a cross section B-B of the present invention.
Figure 12:
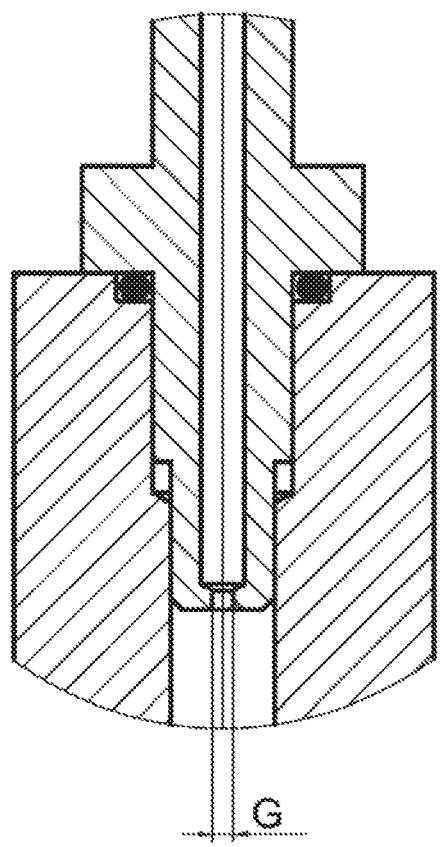
FIG. 12 is an enlarged view of a part R in a cross section B-B of the present invention, where G shown in the figure is a diameter of a damper hole of a hydraulic fluid pipe connector 38.
Figure 13:
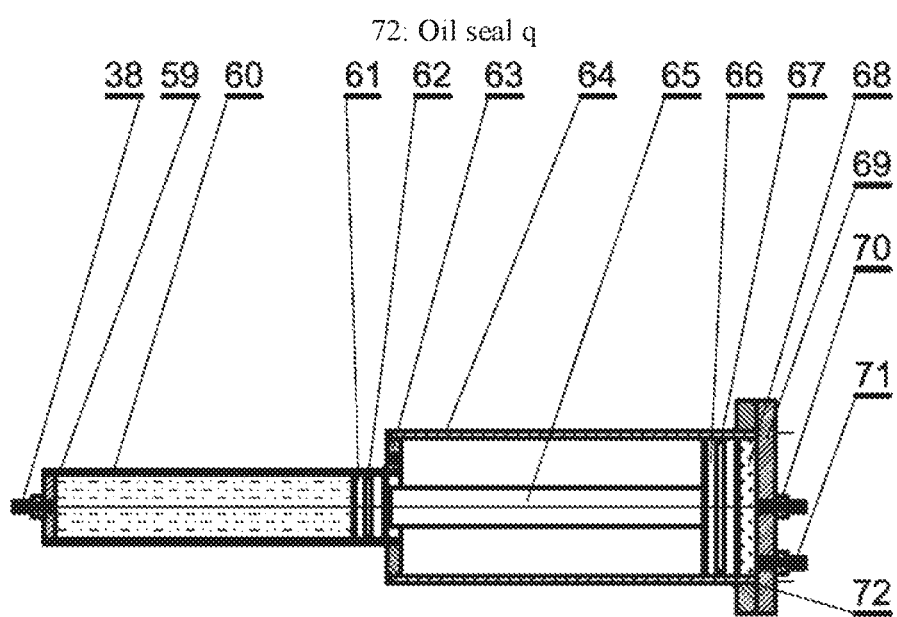
FIG. 13 is a view of a full cross section of an oil-gas linkage plunger pump 9 of the present invention.
Figure 14:
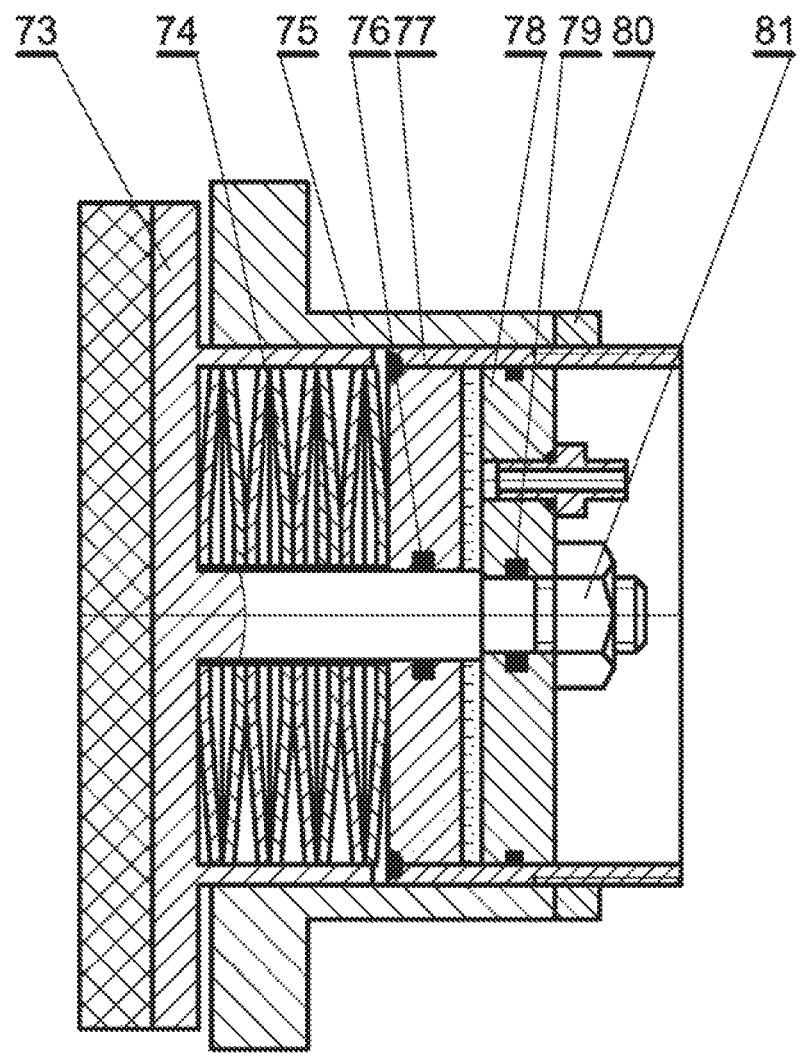
FIG. 14 is a reference diagram of a full cross section of an existing belleville spring brake.
Figure 15:
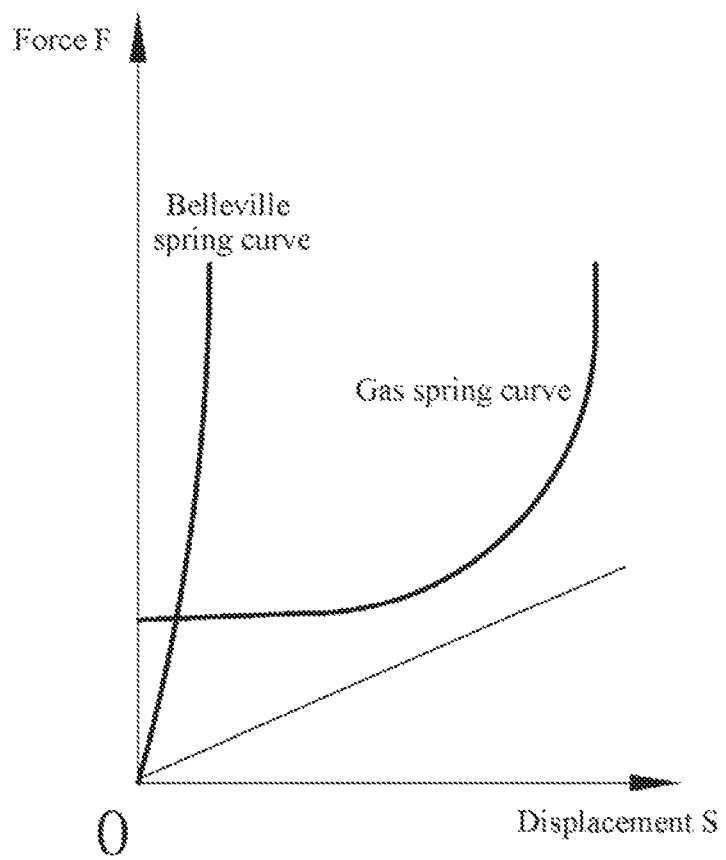
FIG. 15 is a reference diagram of characteristic curves of a belleville spring and a gas spring.

1: Bolt; 2: Secondary brake head; 3: Brake pad; 4: Support base; 5: Floating support; 6: Primary brake head; 7: Hydraulic fluid pipeline; 8: Nitrogen pipeline; 9: Oil-gas linkage plunger pump; 10: Nitrogen cylinder; 11: Pin shaft; 12: Cover; 13: first Spring; 14: Floating limiting oil cylinder; 15: Washer; 16: first Baffle plate; 17: Floating limiting oil cylinder piston rod; 18: Floating limiting oil cylinder cover; 19: first Oil seal; 20: second Oil seal; 21: One-way valve plug; 22: second Spring; 23: third Oil seal; 24: first External circlip; 25: Hydraulic fluid; 26: Floating limiting oil cylinder piston; 27: Floating limiting oil cylinder tube; 28: fourth Oil seal; 29: Floating limiting oil cylinder rear cover; 30: first Nut; 31: Nitrogen cylinder piston; 32: High-pressure nitrogen; 33: High-pressure nitrogen cylinder tube; 34: second Nut; 35: fifth Oil seal; 36: sixth Oil seal; 37: seventh Oil seal; 38: Hydraulic fluid pipe connector; 39: Spacer; 40: Primary brake head shaft; 41: Primary brake head piston; 42: eighth Oil seal; 43: Primary brake head oil cylinder tube; 44: Stroke-limiting oil cylinder; 45: High-pressure nitrogen pipe connector; 46: second Baffle plate; 47: third Spring; 48: Stroke-limiting oil cylinder shaft; 49: tenth Oil seal; 50: Stroke-limiting oil cylinder tube; 51: Steel ball; 52: second External circlip; 53: eleventh Oil seal; 54: Stroke-limiting oil cylinder cover; 55: Puller bolt; 56: Stroke-limiting oil cylinder piston; 57: Nitrogen one-way valve body; 58: thirteenth Oil seal; 59: Plunger oil cylinder cover; 60: Plunger oil cylinder tube; 61: Plunger; 62: fourteenth Oil seal; 63: Air cylinder cover; 64: Air cylinder tube; 65: Plunger tappet; 66: Air cylinder piston; 67: sixteenth Oil seal; 68: Compressed air; 69: Air cylinder tube rear cover; 70: Air inlet regulator valve; 71: Air outlet regulator valve; 72: seventeenth Oil seal; 73: Brake disc; 74: Brake head; 75: Belleville spring; 76: Cylinder liner; 77: eighteenth Oil seal; 78: Oil cylinder body; 79: Piston; 80: nineteenth Oil seal; 81: Fastened nut; 82: fourth Nut.

DETAILED DESCRIPTION OF THE INVENTION

An assembly relationship of a Lin-Xie brake of the present invention is an implementation of the present invention, and the assembly relationship is as follows:

A secondary brake head 2, a plurality of brake pads 3, and a primary brake head 6 are connected to a floating support 5 by using a bolt 1, the floating support 5 is hingedly connected to a support base 4 by using two pin shafts 11, one end of a hydraulic fluid pipeline 7 is connected to a corresponding interface of the primary brake head 6, the other end of the hydraulic fluid pipeline 7 is connected to an oil-gas linkage plunger pump 9, one end of a nitrogen pipeline 8 is connected to a corresponding interface of the primary brake head 6, and the other end of the nitrogen pipeline 8 is connected to a nitrogen cylinder 10.

An assembly relationship of related components is as follows:

The primary brake head 6 is connected to the floating support 5 by using the bolt 1, an above hydraulic fluid pipe connector 38 is connected to the hydraulic fluid pipeline 7, a below high-pressure nitrogen pipe connector 45 is connected to the nitrogen pipeline 8, and the brake pads 3 are connected to a nitrogen cylinder piston 31 by using a bolt or a dovetail groove. The primary brake head 6 includes components of the brake pads 3, a hydraulic fluid 25, the nitrogen cylinder piston 31, a high-pressure nitrogen 32, a high-pressure nitrogen cylinder tube 33, a second nut 34, a fifth oil seal 35, a sixth oil seal 36, a seventh oil seal 37, the hydraulic fluid pipe connector 38, a spacer 39, a primary brake head shaft 40, a primary brake head piston 41, an eighth oil seal 42, a primary brake head oil cylinder tube 43, a stroke-limiting oil cylinder 44, and a high-pressure nitrogen pipe connector 45. An assembly relationship of the components is as follows: the plurality of brake pads 3 are connected to the nitrogen cylinder piston 31 by using the bolt or the dovetail groove, the fifth oil seal 35 is fitted over the nitrogen cylinder piston 31, a thread end of the primary brake head shaft 40 is screwed in a screw hole of the nitrogen cylinder piston 31, and the second nut 34 is tightly screwed. For the spacer 39, an oil inlet hole is drilled above to communicate with a chamber of the hydraulic fluid 25, the seventh oil seal 37 is installed, the hydraulic fluid pipe connector 38 is tightened, an air inlet hole is drilled below to communicate with a chamber of the high-pressure nitrogen 32, the high-pressure nitrogen cylinder tube 33 is welded on the left, the primary brake head oil cylinder tube 43 is welded on the right, the sixth oil seal 36 is fitted over a middle hole, the second oil seal 20, the one-way valve plug 21, the nitrogen one-way valve body 57, the thirteenth oil seal 58, and the seventh oil seal 37 are installed in the air inlet hole, and the high-pressure nitrogen pipe connector 45 is tightened. The nitrogen cylinder piston 31, the fifth oil seal 35, the second nut 34, and the primary brake head shaft 40 are integrated and telescoped in the middle hole of the spacer 39, the primary brake head piston 41, the fifth oil seal 35, and the eighth oil seal 42 are installed, and the second nut 34 is tightly screwed.

The stroke-limiting oil cylinder 44 is connected to the primary brake head 6 by using a bolt, and includes components of an second oil seal 20, a one-way valve plug 21, a second spring 22, the hydraulic fluid 25, a second baffle plate 46, a third spring 47, a stroke-limiting oil cylinder shaft 48, an tenth oil seal 49, a stroke-limiting oil cylinder tube 50, a steel ball 51, a second external circlip 52, an eleventh oil seal 53, a stroke-limiting oil cylinder cover 54, a puller bolt 55, and a stroke-limiting oil cylinder piston 56. An assembly relationship of the components is as follows: the stroke-limiting oil cylinder piston 56 is provided with the second oil seal 20, the one-way valve plug 21, the second spring 22, the tenth oil seal 49, and the eleventh oil seal 53 and then is fitted over the stroke-limiting oil cylinder shaft 48, the external circlip second 52 is clipped to limit the stroke-limiting oil cylinder piston 56 to rotate only by a degree of freedom around an axis, the steel ball 51 is put into a middle hole of the stroke-limiting oil cylinder shaft 48, the puller bolt 55 is screwed, then the above components are together installed in the stroke-limiting oil cylinder tube 50 over which the tenth oil seal 49 is fitted, a stepped shaft end of the stroke-limiting oil cylinder shaft 48 is provided with the second baffle plate 46 and third spring 47 in sequence, a nut is screwed tightly, the stroke-limiting oil cylinder cover 54 over which the tenth oil seal 49 and the eleventh oil seal 53 are fitted is closed, the bolt is tightly screwed, and the hydraulic fluid 25 is injected from an oil injection hole to fill the stroke-limiting oil cylinder 44, to discharge all air and block the oil injection hole. A pretension of the third spring 47 is greater than an opening force for extending the assembled stroke-limiting oil cylinder shaft 48.

A floating limiting oil cylinder 14 is secured in a corresponding hole of the support base 4 by using rear end thread of the floating limiting oil cylinder 14, and includes components of a cover 12, a first spring 13, a washer 15, a first baffle plate 16, a floating limiting oil cylinder piston rod 17, a floating limiting oil cylinder cover 18, an first oil seal 19, the second oil seal 20, the one-way valve plug 21, the second spring 22, the third oil seal 23, the first external circlip 24, the hydraulic fluid 25, a floating limiting oil cylinder piston 26, a floating limiting oil cylinder tube 27, an fourth oil seal 28, a floating limiting oil cylinder rear cover 29, and a first nut 30. An assembly relationship is that: two sets of the second oil seal 20, the one-way valve plug 21, and the second spring 22 are separately installed in two corresponding opposite holes of the floating limiting oil cylinder piston 26, the first oil seal 19 is fitted over a corresponding groove of the floating limiting oil cylinder piston 26, the third oil seal 23 is fitted over the floating limiting oil cylinder piston rod 17 and then the floating limiting oil cylinder piston rod 17 is installed in a middle hole of the floating limiting oil cylinder piston 26, two first external circlips 24 are installed to limit the floating limiting oil cylinder piston 26 to rotating by only a degree of freedom around an axis, a stepped shaft end of the floating limiting oil cylinder piston rod 17 is provided with the floating limiting oil cylinder cover 18 over which the first oil seal 19 and the fourth oil seal 28 are fitted, and the other end of the floating limiting oil cylinder piston rod 17 is provided with the floating limiting oil cylinder rear cover 29 over which the first oil seal 19 and the fourth oil seal 28 are fitted, then the floating limiting oil cylinder tube 27 is installed and is secured together with the floating limiting oil cylinder cover 18 and the floating limiting oil cylinder rear cover 29, and the hydraulic fluid 25 is injected from an oil injection hole to fill the floating limiting oil cylinder 14, to discharge all air and block the oil injection hole. The first spring 13, the cover 12, the first baffle plate 16, the washer 15, and the first nut 30 are installed in sequence, and the cover 12 and the first baffle plate 16 are secured to the floating support 5 by using the bolt. A pretension of the second spring 22 is required to lock, after the first spring 13 is assembled, the hydraulic fluid 25, to prevent the hydraulic fluid 25 from flowing between left and right cavities of the floating limiting oil cylinder piston 26. The first baffle plate 16 is welded to the cover 12, after the first spring 13 is assembled, a pretension of the first spring 13 is less than an opening force for extending the floating limiting oil cylinder piston rod 17 of the floating limiting oil cylinder 14, and the floating support 5 needs to be effectively propped for movement.

An end of a plunger oil cylinder tube 60 of the oil-gas linkage plunger pump 9 communicates with the primary brake head 6 by using the hydraulic fluid pipeline 7 and the hydraulic fluid pipe connector 38, and the other end of the oil-gas linkage plunger pump 9 communicates with an extraneous compressed air pipeline by using an air inlet regulator valve 70. The oil-gas linkage plunger pump 9 includes components such as the hydraulic fluid 25, a plunger oil cylinder cover 59, the plunger oil cylinder tube 60, a plunger 61, a fourteenth oil seal 62, an air cylinder cover 63, an air cylinder tube 64, a plunger tappet 65, an air cylinder piston 66, a sixteenth oil seal 67, compressed air 68, an air cylinder tube rear cover 69, the air inlet regulator valve 70, an air outlet regulator valve 71, and a seventeenth oil seal 72. An assembly relationship of the components is as follows: the air cylinder cover 63 is welded to the plunger oil cylinder tube 60 and the air cylinder tube 64 separately, the hydraulic fluid pipe connector 38 is connected to the end of the plunger oil cylinder tube 60, the fourteenth oil seal 62 is fitted over the plunger 61 and then the plunger 61 is installed in the plunger oil cylinder tube 60. The plunger tappet 65 is thread connected or welded to the air cylinder piston 66, the sixteenth oil seal 67 is fitted, and the components are put in the air cylinder tube 64 together. The seventeenth oil seal 72 is disposed in a corresponding oil seal groove at an end of the air cylinder tube 64, the air cylinder tube rear cover 69 is connected to the air cylinder tube 64 by using a bolt, and the air inlet regulator valve 70 and the air outlet regulator valve 71 are installed. A working chamber of the plunger oil cylinder tube 60 is filled with the hydraulic fluid 25, to discharge all air.

What is claimed is:

1. A brake, comprising:
    a bolt, a secondary brake head, a plurality of brake pads, a support base, a floating support, a primary brake head, a hydraulic fluid pipeline, a nitrogen pipeline, plunger pump, a nitrogen cylinder, a pin shaft, a floating limiting oil cylinder, and a nitrogen one-way valve body;
    wherein the secondary brake head, the plurality of brake pads, and the primary brake head are connected to the floating support through the bolt;
    wherein the floating support hinges to the support base through the plurality of pin shafts;
    wherein a first end of the hydraulic fluid pipeline is connected to a corresponding interface of the primary brake head,
    a second end of the hydraulic fluid pipeline is connected to the plunger pump;
    wherein a first end of the nitrogen pipeline is connected to a corresponding interface of the primary brake head; and
    a second end of the nitrogen pipeline is connected to the nitrogen cylinder.

2. The brake according to claim 1, wherein the primary brake head comprises the plurality of brake pads, a hydraulic fluid, a nitrogen cylinder piston, a high-pressure nitrogen, a high-pressure nitrogen cylinder tube, a first nut, a first oil seal, a second oil seal, a third oil seal, a hydraulic fluid pipe connector, a spacer, a primary brake head shaft, a primary brake head piston, a fourth oil seal, a primary brake head oil cylinder tube, a stroke-limiting oil cylinder, and a high-pressure nitrogen pipe connector;
    wherein the primary brake head is connected to the floating support through the bolt, an above hydraulic fluid pipe connector is connected to the hydraulic fluid pipeline, a below high-pressure nitrogen pipe connector is connected to the nitrogen pipeline, and the plurality of brake pads are connected to the nitrogen cylinder piston through a bolt or a dovetail groove.

3. The brake according to claim 1, further comprises a stroke-limiting oil cylinder, wherein the stroke-limiting oil cylinder comprises a first oil seal, an one-way valve plug, a first spring, a hydraulic fluid, a first baffle plate, a second spring, a stroke-limiting oil cylinder shaft, a second oil seal, a stroke-limiting oil cylinder tube, a steel ball, a first external circlip, a third oil seal, a stroke-limiting oil cylinder cover, a puller bolt, and a stroke-limiting oil cylinder piston;
    wherein the stroke-limiting oil cylinder is connected to the primary brake head through a bolt.

4. The brake according to claim 1, wherein the floating limiting oil cylinder comprises a cover, a first spring, a washer, a first baffle plate, a floating limiting oil cylinder piston rod, a floating limiting oil cylinder cover, a first oil seal, a second oil seal, an one-way valve plug, a second spring, a third oil seal, a first external circlip, a hydraulic fluid, a floating limiting oil cylinder piston, a floating limiting oil cylinder tube, a fourth oil seal, a floating limiting oil cylinder rear cover, and a first nut;

wherein the floating limiting oil cylinder is secured in a corresponding hole of the support base through a rear end thread therein.

5. The brake according to claim 1, wherein an end of an plunger oil cylinder tube comprises a hydraulic fluid, a plunger oil cylinder cover, a plunger oil cylinder tube, a plunger, a first oil seal, an air cylinder cover, an air cylinder tube, a plunger tappet, an air cylinder piston, a second oil seal, a compressed air, an air cylinder tube rear cover, an air inlet regulator valve, an air outlet regulator valve, a third oil seal;

wherein a first end of the plunger oil cylinder tube of the plunger pump communicates with the primary brake head through the hydraulic fluid pipeline and the hydraulic fluid pipe connector, and a second end of the plunger pump communicates with an extraneous compressed air pipeline by using the air inlet regulator valve.

6. The brake according to claim 2, wherein the primary brake head is connected to the floating support through the bolt, the above hydraulic fluid pipe connector is connected to the hydraulic fluid pipeline, the below high-pressure nitrogen pipe connector is connected to the nitrogen pipeline, and the a plurality of brake pads are connected to the nitrogen cylinder piston through a bolt or a dovetail groove; wherein the plurality of brake pads are connected to the nitrogen cylinder piston through the bolt or the dovetail groove, the first oil seal is fitted over the nitrogen cylinder piston, a thread end of the primary brake head shaft is screwed in a screw hole of the nitrogen cylinder piston, and the first nut is tightly screwed; wherein an oil inlet hole is provided above the spacer to communicate with a chamber of the hydraulic fluid, an air inlet hole is provided below the hydraulic fluid pipe connector to communicate with a chamber of the high-pressure nitrogen, the high-pressure nitrogen cylinder tube is welded on the left, the primary brake head oil cylinder tube is welded on the right, the second oil seal is fitted over a middle hole, a fifth oil seal, a one-way valve plug, the nitrogen one-way valve body, a sixth oil seal, and a seventh oil seal are installed in the air inlet hole; the nitrogen cylinder piston, the first oil seal, the first nut, and the primary brake head shaft are integrated and telescoped in the middle hole of the spacer.

7. The brake according to claim 3, wherein the stroke-limiting oil cylinder piston is provided with the first oil seal, the one-way valve plug, the first spring, the second oil seal, and the third oil seal and fitted over the stroke-limiting oil cylinder shaft, the first external circlip is clipped to limit the stroke-limiting oil cylinder piston to rotate only by a degree of freedom around an axis, the steel ball is arranged in a middle hole of the stroke-limiting oil cylinder shaft, the puller bolt is screwed to form an assembly, the assembly is installed in the stroke-limiting oil cylinder tube fitted with the second oil seal, a stepped shaft end of the stroke-limiting oil cylinder shaft is provided with the first baffle plate and the second spring in sequence, the stroke-limiting oil cylinder is filled with the hydraulic fluid; wherein a pretension of the second spring is greater than an opening force for extending the assembled stroke-limiting oil cylinder shaft.

8. The brake according to claim 4, wherein two sets of the second oil seal, the one-way valve plug, and the second spring are separately installed in two corresponding opposite holes of the floating limiting oil cylinder piston, and the first oil seal is fitted over a corresponding groove of the floating limiting oil cylinder piston, the third oil seal is fitted over the floating limiting oil cylinder piston rod and the floating limiting oil cylinder piston rod is installed in a middle hole of the floating limiting oil cylinder piston, two first external circlips are installed to limit the floating limiting oil cylinder piston to rotating by only a degree of freedom around an axis, a stepped shaft end of the floating limiting oil cylinder piston rod is provided with the floating limiting oil cylinder cover fitted with the first oil seal and the fourth oil seal, and a second end of the floating limiting oil cylinder piston rod is provided with the floating limiting oil cylinder rear cover fitted with the first oil seal and the fourth oil seal, the floating limiting oil cylinder tube is installed and fixed together with the floating limiting oil cylinder cover and the floating limiting oil cylinder rear cover, the floating limiting oil cylinder is filled with the hydraulic fluid; then the first spring, the cover, the first baffle plate, the washer, and the first nut are installed in sequence, and the cover and the first baffle plate are secured to the floating support through the bolt; wherein a pretension of the second spring locks the hydraulic fluid to prevent the hydraulic fluid from flowing between left and right cavities of the floating limiting oil cylinder piston after the first spring is assembled; wherein the first baffle plate is welded to the cover, wherein a pretension of the first spring is less than an opening force for extending the floating limiting oil cylinder piston rod of the floating limiting oil cylinder, and the floating support is effectively propped for movement.

9. The brake according to claim 4, wherein an air cylinder cover is welded to a plunger oil cylinder tube and an air cylinder tube separately, and a hydraulic fluid pipe connector is connected to an end of the plunger oil cylinder tube, a fifth oil seal is fitted over a plunger and the plunger is installed in the plunger oil cylinder tube; a plunger tappet is thread connected or welded to an air cylinder piston, a sixth oil seal is fitted to form an assembly, and the assembly is put in the air cylinder tube; a seventh oil seal is disposed in a corresponding oil seal groove at an end of the air cylinder tube, an air cylinder tube rear cover is connected to the air cylinder tube by using a bolt, and an air inlet regulator valve and an air outlet regulator valve are installed; and a working chamber of the plunger oil cylinder tube is filled with a hydraulic fluid.

10. The brake according to claim 1, wherein a system is configured to stop a brake disc from rotating, wherein a system instructs an air outlet regulator valve of the plunger pump to discharge a portion of compressed air, and simultaneously close an air inlet regulator valve, so that a plurality of brake pads tightly abut against the brake disc under a pressure, to generate a brake force, and the brake disc is enabled to softly stop rotating.

11. The brake according to claim 1, wherein a system is configured to brake, wherein the system instructs the plunger pump to fully open an air outlet regulator valve, and simultaneously close an air inlet regulator valve, so that the plurality of brake pads tightly abut against the brake disc under a set maximum pressure, and the brake disc is enabled to rapidly stop rotating.

12. The brake according to claim 1, wherein a system is configured to release the brake pads, wherein the system instructs the plunger pump to open an air inlet regulator valve, and simultaneously close an air outlet regulator valve to take in some compressed air as a pressure, and maintain the pressure, wherein the pressure taken in releases the plurality of brake pads.

\* \* \* \* \*